(12) United States Patent
Zeng et al.

(10) Patent No.: US 9,997,277 B1
(45) Date of Patent: Jun. 12, 2018

(54) INDEFECTIBLE CABLE AND MANUFACTURING PROCESS THEREOF

(71) Applicant: Chongqing Yufeng Xinxin Wire & Cable Technology Co., Ltd., Chongqing (CN)

(72) Inventors: Lingguo Zeng, Chongqing (CN); Zhijun Li, Chongqing (CN)

(73) Assignee: CHONGQING YUFENG XINXIN WIRE & CABLE TECHNOLOGY CO., LTD., Chongqing (CN)

( * ) Notice: Subject to any disclaimer, the term of this patent is extended or adjusted under 35 U.S.C. 154(b) by 0 days. days.

(21) Appl. No.: 15/800,219

(22) Filed: Nov. 1, 2017

(30) Foreign Application Priority Data

Jun. 30, 2017 (CN) .......................... 2017 1 0519958

(51) Int. Cl.
*H01B 13/22* (2006.01)
*H01B 7/20* (2006.01)
*H01B 13/06* (2006.01)
*H01B 7/02* (2006.01)

(52) U.S. Cl.
CPC ................. *H01B 7/20* (2013.01); *H01B 7/02* (2013.01); *H01B 13/06* (2013.01); *H01B 13/22* (2013.01)

(58) Field of Classification Search
USPC ..................................................... 174/102 R
See application file for complete search history.

(56) References Cited

U.S. PATENT DOCUMENTS

| | | | | |
|---|---|---|---|---|
| 349,893 | A * | 9/1886 | McGill | H02G 3/0487 138/156 |
| 3,314,451 | A * | 4/1967 | Heupgen | B21C 37/15 138/177 |
| 3,378,077 | A * | 4/1968 | Elliston | E21B 33/12 166/114 |
| 3,420,095 | A * | 1/1969 | Meaux | G01M 3/005 166/129 |
| 4,310,163 | A * | 1/1982 | Pippert | F16J 15/166 277/562 |
| 4,429,566 | A * | 2/1984 | Armell | G01M 3/223 73/40.7 |
| 5,945,631 | A * | 8/1999 | Henrikson | H01B 11/1033 174/102 R |
| 2003/0156805 | A1* | 8/2003 | Shi | G02B 6/4419 385/100 |
| 2006/0204181 | A1* | 9/2006 | Reynolds | G02B 6/3887 385/76 |
| 2010/0146785 | A1* | 6/2010 | Portas | H02G 1/14 29/868 |

* cited by examiner

*Primary Examiner* — William H Mayo, III
*Assistant Examiner* — Krystal Robinson
(74) *Attorney, Agent, or Firm* — Benesch, Friedlander, Coplan & Aronoff LLP

(57) ABSTRACT

An indefectible cable comprises a cable jacket with cable cores arranged in an inner cavity thereof and a metal ring sleeved on an outer wall thereof. Both ends of the cable jacket are fixedly connected with an anti-extrusion device respectively, through which the cable cores are led out from through-holes. The anti-extrusion device has a metal housing with plastic lining. With the arrangement of a buffer device, the externally applied pressure on the cable is relieved to reduce the damage thereof.

7 Claims, 2 Drawing Sheets

INDEFECTIBLE CABLE AND MANUFACTURING PROCESS THEREOF

FIELD OF THE INVENTION

The invention relates to the technical field of cables, in particular to an indefectible cable and manufacturing process thereof.

DESCRIPTION OF THE RELATED ART

Cables are mainly used for the strong electricity transmission through lines for power generation, distribution, transmission, transformation and supply. These lines carry strong current (tens to thousands amp) and high voltage (220V to 500 kV and above). Cables are hanged in the air, buried underground or exposed in the open air. For low resistance to pressure, cable cores in the cables of the prior art are prone to damage after a long period of treading, which threatens and reduces service life of the cables.

SUMMARY OF THE INVENTION

A purpose of the invention is to provide an indefectible cable and manufacturing process thereof to solve the problems in the prior art.

In order to achieve the purpose, the invention provides the following technical solution: an indefectible cable, comprising a cable jacket with cable cores arranged in an inner cavity thereof, wherein an outer wall of the cable jacket is sleeved by a metal ring; both ends of the cable jacket are fixedly connected with an anti-extrusion device respectively, through which the cable cores are led out from through-holes; the anti-extrusion device has metal housing, the inside of the metal housing is a plastic lining; an asbestos gauze is arranged between the plastic lining and the metal housing; the cable cores are located in an inner cavity of the plastic lining; multiple cable cores are interconnected through buffer devices; the buffer device comprises two sets of buffer rods which are jointed with two sets of adjacent cable cores by hinges; both sets of the buffer rods are hinged mutually; the buffer rod is provided with a buffer slot, and ends of a spring piece punch through the buffer slot; limit blocks are integrated with the ends of the buffer slot; is fixed on the limit block is fixed on the limit blocks; and the buffer slider moves in a buffer slide way, and the buffer slide way is located in the buffer rod.

Preferably, the buffer slot is located in the middle of the buffer rod.

Preferably, the anti-extrusion device is arranged on both ends of the cable cores respectively.

A process for manufacturing the indefectible cable comprises the following steps:

S1: manufacturing a cable core: drawing several metallic conductors into wires at a high temperature to form metal wires, and wrapping-metal wires into a strand to form the cable core;

S2: molding a cable jacket: placing the middle section of the cable core in a mold 1, pouring a plastic cement into the mold 1, placing the mold 1 into a mold box, setting the temperature mode of the mold box to gradient cooling, and separating the molded cable jacket from the mold 1;

S3: manufacturing an anti-extrusion device: pouring a metallic solution into a mold 2, cooling the mold 2 with the metallic solution for a period of time until a metal housing is formed, obtaining a plastic lining after compression molding of a plastic raw material, making diameter of the plastic lining less than that of the metal housing, filling the space between the metal housing and the plastic lining with an asbestos gauze, and welding annular spacing rings on an internal wall of the plastic lining in an annular manner;

S4: fixing the anti-extrusion device: welding the manufactured anti-extrusion device on an external wall of the cable jacket;

S5: limiting the cable cores: manually passing the cable cores through the corresponding spacing rings; and S6: manufacturing a buffer device: punching a top of a buffer rod to form a concave buffer slot by a punching machine, punching a buffer slide way in the buffer rod by the punching machine with the diameter of the buffer slide way less than that of the buffer slot, welding a hinge on the external wall of the cable cores, hinging the other end of the hinge to the buffer rod, and manually hinging both sets of the buffer rods to obtain the buffer device;

Preferably, the changes in temperature are 5° C., 10° C. and 13° C. respectively in the Step S2.

Preferably, the metallic solution is cooled for 1-2 hours in the mold 2 in the Step S3.

Preferably, both the mold 1 and the mold 2 are in hollow cylindrical structure, and inner diameter of the mold 1 equals outer diameter of the mold 2.

Compared with the prior art, the invention has the following beneficial effects:

1. with the arrangement of the anti-extrusion devices, the connections on both ends of the cable are protected against any damage from pulling the cable backwards and forwards or treading the cable, thus prolonging the service life of the cable, and the through-holes keep a certain clearance among the cable cores to assist in heat dissipation by preventing accumulation of heat due to highly concentrated metal wires.

2. with the arrangement of the buffer devices, the externally applied pressure on the cable is relieved to reduce the damage thereof; and 3. The processing technology is simple and easy to use, and the workload is relatively low.

Figure 1:
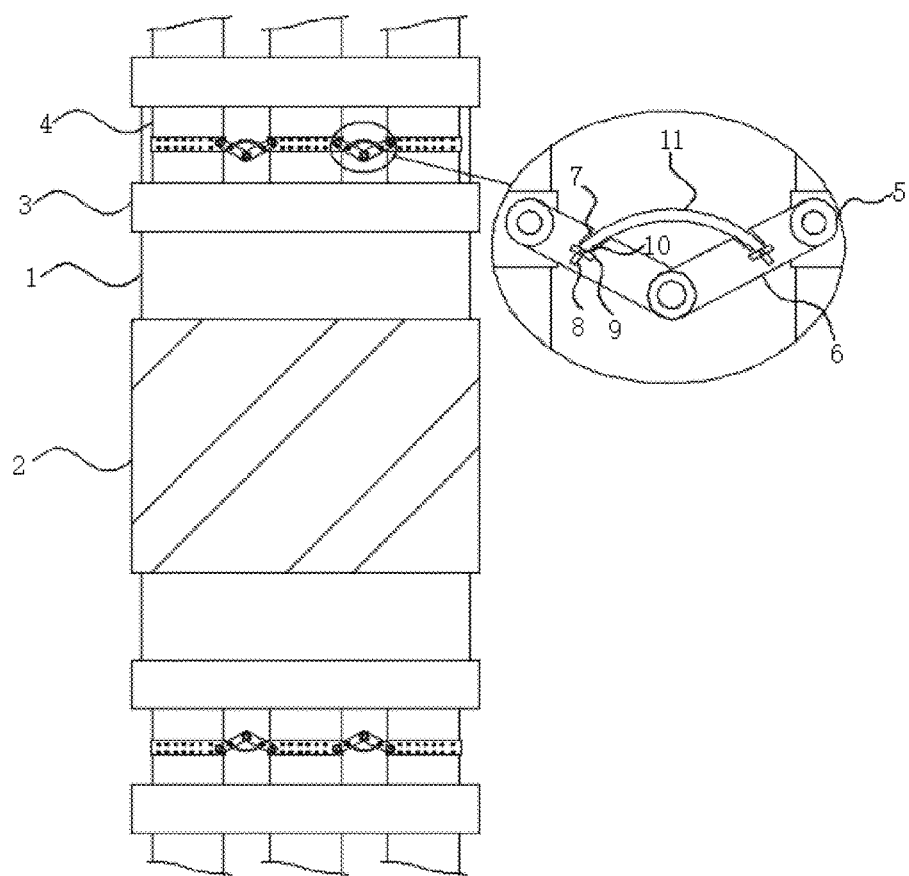
FIG. 1 is a structural diagram of the invention.

Marks in the figures, cable jacket 1, metal ring 2, anti-extrusion device 3, cable core 4, hinge 5, buffer rod 6, buffer slot 7, buffer slide way 8, limit block 9, buffer slider 10, spring piece 11, asbestos gauze 12, plastic lining 13 and metal housing 14.

DESCRIPTION OF THE PREFERRED EMBODIMENTS

The technical solutions in the embodiments of the invention will be described clearly and completely as follows. Apparently, the embodiments described are only some embodiments of the invention, but not all embodiments. Based on the embodiments of the invention, all other embodiments obtained by those of ordinary skill in the art without creative work fall within the protection scope of the invention.

Embodiment 1

Figure 2:
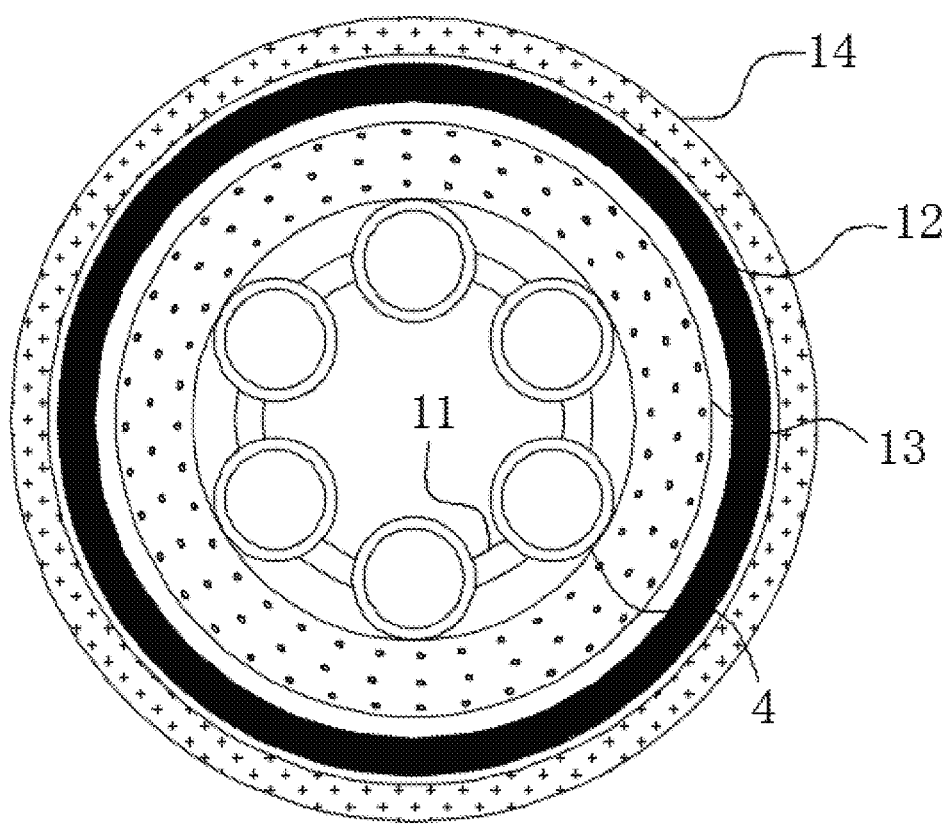
FIG. 2 is a structural diagram of the anti-extrusion device of the invention.

The invention provided a technical solution: referred to FIG. 1 and FIG. 2, an indefectible cable, comprising a cable jacket (1) with cable cores (4) arranged in an inner cavity thereof, wherein an outer wall of the cable jacket (1) was sleeved by a metal ring (2), both ends of the cable jacket (1) were fixedly connected with an anti-extrusion device (3) respectively; the anti-extrusion devices (3) were arranged on both ends of the cable cores (4), through which the cable cores (4) were led out from through-holes; the anti-extrusion device (3) had a metal housing (14), the inside of the metal housing (14) was a plastic lining (13); an asbestos gauze (12) was arranged between the plastic lining (13) and the metal housing (14); the cable cores (4) were located in an inner cavity of the plastic lining (13); multiple cable cores (4) were interconnected through buffer devices; the buffer device comprised two sets of buffer rods (6) which were jointed with two sets of adjacent cable cores (4) by hinges (5); both sets of the buffer rods (6) were hinged mutually; the buffer rod (6) was provided with a buffer slot (7) respectively, and ends of a spring piece (11) punched through the buffer slot (7); the buffer slot (7) was located in the middle of the buffer rod (6); limit blocks (9) were integrated with the ends of the buffer slot (7); a buffer slider (10) was fixed on the limit block (9); and the buffer slider (10) moved in a buffer slide way (8), and the buffer slide way (8) was located in the buffer rod (6).

A process for manufacturing the indefectible cable comprised the following steps:

S1: manufacturing a cable core (4): drawing several metallic conductors into wires at a high temperature to form metal wires, and wrapping 6 metal wires into a strand to form the cable core (4);

S2: molding a cable jacket (1): placing the middle section of the cable core (4) in a mold 1, pouring a plastic cement into the mold 1, placing the mold 1 into a mold box, setting the temperature mode of the mold box to gradient cooling (changes in temperature were 5° C., 10° C. and 13° C. respectively), and separating the molded cable jacket (1) from the mold 1;

S3: manufacturing an anti-extrusion device (3): pouring a metallic solution into a mold 2, cooling the mold 2 with the metallic solution for a period of time until a metal housing (14) is formed, obtaining a plastic lining (13) after compression molding of a plastic raw material, making diameter of the plastic lining (13) less than that of the metal housing (14), filling the space between the metal housing (14) and the plastic lining (13) with an asbestos gauze (12), and welding annular spacing rings on an internal wall of the plastic lining (13) in an annular manner;

S4: fixing the anti-extrusion device (3): welding the manufactured anti-extrusion device (3) on an external wall of the cable jacket (1);

S5: limiting the cable cores (4): manually passing the cable cores (4) through the corresponding spacing rings; and S6: manufacturing a buffer device: punching a top of a buffer rod (6) to form a concave buffer slot (7) by a punching machine, punching a buffer slide way (8) in the buffer rod (6) by the punching machine with the diameter of the buffer slide way (8) less than that of the buffer slot (7), welding a hinge (5) on the external wall of the cable cores (4), hinging the other end of the hinge (5) to the buffer rod (6), and manually hinging both sets of the buffer rods (6) to obtain the buffer device.

Embodiment 2

The invention provided a technical solution: referred to FIG. 1 and FIG. 2, an indefectible cable, comprising a cable jacket (1) with cable cores (4) arranged in an inner cavity thereof, wherein an outer wall of the cable jacket (1) was sleeved by a metal ring (2), both ends of the cable jacket (1) were fixedly connected with an anti-extrusion device (3) respectively; the anti-extrusion devices (3) were arranged on both ends of the cable cores (4), through which the cable cores (4) were led out from through-holes; the anti-extrusion device (3) had a metal housing (14), the inside of the metal housing (14) was a plastic lining (13); an asbestos gauze (12) was arranged between the plastic lining (13) and the metal housing (14); the cable cores (4) were located in an inner cavity of the plastic lining (13); multiple cable cores (4) were interconnected through buffer devices; the buffer device comprised two sets of buffer rods (6) which were jointed with two sets of adjacent cable cores (4) by hinges (5); both sets of the buffer rods (6) were hinged mutually; the buffer rod (6) was provided with a buffer slot (7) respectively, and ends of a spring piece (11) punched through the buffer slot (7); the buffer slot (7) was located in the middle of the buffer rod (6); limit blocks (9) were integrated with the ends of the buffer slot (7); a buffer slider (10) was fixed on the limit block (9); and the buffer slider (10) moved in a buffer slide way (8), and the buffer slide way (8) was located in the buffer rod (6).

A process for manufacturing the indefectible cable comprised the following steps:

S1: manufacturing a cable core (4): drawing several metallic conductors into wires at a high temperature to form metal wires, and wrapping 3 metal wires into a strand to form the cable core (4);

S2: molding a cable jacket (1): placing the middle section of the cable core (4) in a mold 1, pouring a plastic cement into the mold 1, placing the mold 1 in a mold box, setting the temperature mode of the mold box to gradient cooling (the changes in temperature were 5° C., 10° C. and 13° C. respectively), and separating the molded cable jacket (1) from the mold 1;

S3: manufacturing an anti-extrusion device (3): pouring a metallic solution into a mold 2, cooling the mold 2 with the metallic solution for 2 hours to obtain a metal housing (14) (both the mold 1 and the mold 2 were in hollow cylindrical structure, and inner diameter of the mold 1 equaled outer diameter of the mold 2), obtaining a plastic lining (13) after compression molding of a plastic raw material, making diameter of the plastic lining (13) less than that of the metal housing (14), filling the space between the metal housing (14) and the plastic lining (13) with an asbestos gauze (12), and welding annular spacing rings on an internal wall of the plastic lining (13) in an annular manner;

S4: fixing the anti-extrusion device (3): welding the manufactured anti-extrusion device (3) on an external wall of the cable jacket (1);

S5: limiting the cable cores (4): manually passing the cable cores (4) through the corresponding spacing rings; and S6: manufacturing a buffer device: punching a top of a buffer rod (6) to form a concave buffer slot (7) by a punching machine, punching a buffer slide way (8) in the buffer rod (6) by the punching machine with the diameter of the buffer slide way (8) less than that of the buffer slot (7), welding a hinge (5) on the external wall of the cable cores (4), hinging the other end of the hinge (5) to the buffer rod (6), and manually hinging both sets of the buffer rods (6) to obtain the buffer device.

Embodiment 3

The invention provided a technical solution: referred to FIG. 1 and FIG. 2, an indefectible cable, comprising a cable jacket (1) with cable cores (4) arranged in an inner cavity thereof, wherein an outer wall of the cable jacket (1) was sleeved by a metal ring (2), both ends of the cable jacket (1) were fixedly connected with an anti-extrusion device (3) respectively; the anti-extrusion devices (3) were arranged on both ends of the cable cores (4), through which the cable cores (4) were led out from through-holes; the anti-extrusion device (3) had a metal housing (14), the inside of the metal housing (14) was a plastic lining (13); an asbestos gauze (12) was arranged between the plastic lining (13) and the metal housing (14); the cable cores (4) were located in an inner cavity of the plastic lining (13); multiple cable cores (4) were interconnected through buffer devices; the buffer device comprised two sets of buffer rods (6) which were jointed with two sets of adjacent cable cores (4) by hinges (5); both sets of the buffer rods (6) were hinged mutually; the buffer rod (6) was provided with a buffer slot (7) respectively, and ends of a spring piece (11) punched through the buffer slot (7); the buffer slot (7) was located in the middle of the buffer rod (6); limit blocks (9) were integrated with the ends of the buffer slot (7); a buffer slider (10) was fixed on the limit block (9); and the buffer slider (10) moved in a buffer slide way (8), and the buffer slide way (8) was located in the buffer rod (6).

A process for manufacturing the indefectible cable comprised the following steps:

S1: manufacturing a cable core (4): drawing several metallic conductors into wires at a high temperature to form metal wires, and wrapping 4 metal wires into a strand to form the cable core (4);

S2: molding a cable jacket (1): placing the middle section of the cable core (4) in a mold 1, pouring a plastic cement into the mold 1, placing the mold 1 in a mold box, setting the temperature mode of the mold box to gradient cooling (the changes in temperature were 5° C., 10° C. and 13° C. respectively), and separating the molded cable jacket (1) from the mold 1;

S3: manufacturing an anti-extrusion device (3): pouring a metallic solution into a mold 2, cooling the mold 2 with the metallic solution for 2 hours to obtain a metal housing (14) (both the mold 1 and the mold 2 were in hollow cylindrical structure, and inner diameter of the mold 1 equaled outer diameter of the mold 2), obtaining a plastic lining (13) after compression molding of a plastic raw material, making diameter of the plastic lining (13) less than that of the metal housing (14), filling the space between the metal housing (14) and the plastic lining (13) with an asbestos gauze (12), and welding annular spacing rings on an internal wall of the plastic lining (13) in an annular manner;

S4: fixing the anti-extrusion device (3): welding the manufactured anti-extrusion device (3) on an external wall of the cable jacket (1);

S5: limiting the cable cores (4): manually passing the cable cores (4) through the corresponding spacing rings; and S6: manufacturing a buffer device: punching a top of a buffer rod (6) to form a concave buffer slot (7) by a punching machine, punching a buffer slide way (8) in the buffer rod (6) by the punching machine with the diameter of the buffer slide way (8) less than that of the buffer slot (7), welding a hinge (5) on the external wall of the cable core (4), hinging the other end of the hinge (5) to the buffer rod (6), and manually hinging both sets of the buffer rods (6) to obtain the buffer device.

With the arrangement of the anti-extrusion devices (3) of the invention, the connections on both ends of the cable are protected against any damage from pulling the cable backwards and forwards or treading the cable, thus prolonging the service life of the cable, and the through-holes keep a certain clearance among the cable cores to assist in heat dissipation by preventing accumulation of heat due to highly concentrated metal wires; with the arrangement of the buffer devices, the externally applied pressure on the cable is relieved to reduce the damage thereof; and the processing technology is simple and easy to use, and the workload is relatively low.

Although several embodiments of the invention have been showed and described, those of ordinary skill in the art should understand that they can make various changes, modifications, replacements and alterations to these embodiments without departing from the spirit and essence of the invention. The protection scope of the invention is defined by the appended claims and equivalent.

What is claimed is:

1. An indefectible cable, comprising a cable jacket (1) with cable cores (4) arranged in an inner cavity thereof, characterized in that an outer wall of the cable jacket (1) is sleeved by a metal ring (2); both ends of the cable jacket (1) are fixedly connected with an anti-extrusion device (3) respectively, through which the cable cores (4) are led out from through-holes; the anti-extrusion device (3) has a metal housing (14), the inside of the metal housing (14) is a plastic lining (13); an asbestos gauze (12) is arranged between the plastic lining (13) and the metal housing (14); the cable cores (4) are located in an inner cavity of the plastic lining (13); multiple cable cores (4) are interconnected through buffer devices; the buffer device comprises two sets of buffer rods (6) which are jointed with two sets of adjacent cable cores (4) by hinges (5); both sets of the buffer rods (6) are hinged mutually; the buffer rod (6) is provided with a buffer slot (7), and ends of a spring piece (11) punch through the buffer slot (7); limit blocks (9) are integrated with the ends of the buffer slot (7); a buffer slider (10) is fixed on the limit block (9); and the buffer slider (10) moves in a buffer slide way (8), and the buffer slide way (8) is located in the buffer rod (6).

2. The indefectible cable of claim 1, characterized in that the buffer slot (7) is located in the middle of the buffer rod (6).

3. The indefectible cable of claim 1, characterized in that the anti-extrusion device (3) is arranged on both ends of the cable core (4) respectively.

4. A process for manufacturing the indefectible cable of claim 1, characterized in that the process comprises the following steps:

S1: manufacturing a cable core (4): drawing several metallic conductors into wires at a high temperature to form metal wires, and wrapping 3 to 6 metal wires into a strand to form the cable core (4);

S2: molding a cable jacket (1): placing the middle section of the cable core (4) in a mold 1, pouring a plastic cement into the mold 1, placing the mold 1 into a mold box, setting the temperature mode of the mold box to gradient cooling, and separating the molded cable jacket (1) from the mold 1;

S3: manufacturing an anti-extrusion device (3): pouring a metallic solution into a mold 2, cooling the mold 2 with the metallic solution for a period of time until a metal housing (14) is formed, obtaining a plastic lining (13) after compression molding of a plastic raw material, making diameter of the plastic lining (13) less than that of the metal housing (14), filling the space between the metal housing (14) and the plastic lining (13) with an asbestos gauze (12), and welding annular spacing rings on an internal wall of the plastic lining (13) in an annular manner;

S4: fixing the anti-extrusion device (3): welding the manufactured anti-extrusion device (3) on an external wall of the cable jacket (1);

S5: limiting the cable cores (4): manually passing the cable cores (4) through the corresponding spacing rings; and S6: manufacturing a buffer device: punching a top of a buffer rod (6) to form a concave buffer slot (7) by a punching machine, punching a buffer slide way (8) in the buffer rod (6) by the punching machine with the diameter of the buffer slide way (8) less than that of the buffer slot (7), welding a hinge (5) on the external wall of the cable cores (4), hinging the other end of the hinge (5) to the buffer rod (6), and manually hinging both sets of the buffer rods (6) to obtain the buffer device.

5. The process for manufacturing the indefectible cable of claim 4, characterized in that the changes in temperature are 5° C., 10° C. and 13° C. respectively in the step S2.

6. The process for manufacturing the indefectible cable of claim 4, characterized in that the metallic solution is cooled for 1-2 hours in the mold 2 in the Step S3.

7. The process for manufacturing the indefectible cable of claim 4, characterized in that both the mold 1 and the mold 2 are in hollow cylindrical structure, and inner diameter of the mold 1 equals outer diameter of the mold 2.

* * * * *